(12) United States Patent
Zhang et al.

(10) Patent No.: US 12,292,396 B2
(45) Date of Patent: May 6, 2025

(54) X-RAY ANALYSIS SYSTEM AND METHOD WITH MULTI-SOURCE DESIGN

(71) Applicant: Shenzhen Angstrom Excellence Technology Co. Ltd, ShenZhen (CN)

(72) Inventors: Xuena Zhang, ShenZhen (CN); Feng Hong, ShenZhen (CN); Cuihuan Wang, ShenZhen (CN)

(73) Assignee: SHENZHEN ANGSTROM EXCELLENCE TECHNOLOGY CO. LTD, Shenzhen (CN)

( * ) Notice: Subject to any disclaimer, the term of this patent is extended or adjusted under 35 U.S.C. 154(b) by 187 days.

(21) Appl. No.: 18/158,223

(22) Filed: Jan. 23, 2023

(65) Prior Publication Data

US 2023/0236143 A1    Jul. 27, 2023

(30) Foreign Application Priority Data

Jan. 25, 2022    (CN) ......................... 202210103584.X

(51) Int. Cl.
*G01N 23/201*    (2018.01)
*G01N 23/207*    (2018.01)
(Continued)

(52) U.S. Cl.
CPC ....... *G01N 23/2206* (2013.01); *G01N 23/201* (2013.01); *G01N 23/207* (2013.01);
(Continued)

(58) Field of Classification Search
None
See application file for complete search history.

(56) References Cited

U.S. PATENT DOCUMENTS 6,816,570 B2 * 11/2004 Janik ...................... G01N 23/20
378/50
6,829,327 B1 * 12/2004 Chen .................... G01N 23/223
378/82
(Continued)

FOREIGN PATENT DOCUMENTS

CN    1328639 A    12/2001
CN    101278360 A    10/2008
(Continued)

OTHER PUBLICATIONS

Office Action in CN202210103584.X, mailed Jul. 18, 2022, 11 pages.
(Continued)

*Primary Examiner* — Thomas R Artman
(74) *Attorney, Agent, or Firm* — ARENTFOX SCHIFF LLP

(57) ABSTRACT

An X-ray analysis system is provided with multi-source design and an X-ray analysis method is provided with multi-source design. According to the embodiments, the X-ray analysis system includes a ray source including a plurality of ray generating devices that generate a ray; a detector that detects a signal generated due to an analyzed object being irradiated by the ray from the ray source; and a controller that controls the ray source, so that two or more ray generating devices in the ray source simultaneously generate corresponding rays to irradiate the analyzed object.

16 Claims, 11 Drawing Sheets

(51) Int. Cl.
*G01N 23/2206* (2018.01)
*G01N 23/223* (2006.01)

(52) U.S. Cl.
CPC ..... *G01N 23/223* (2013.01); *G01N 2223/052* (2013.01); *G01N 2223/054* (2013.01); *G01N 2223/056* (2013.01); *G01N 2223/071* (2013.01); *G01N 2223/076* (2013.01); *G01N 2223/1016* (2013.01); *G01N 2223/3307* (2013.01); *G01N 2223/6116* (2013.01)

(56) References Cited

U.S. PATENT DOCUMENTS

| | | | | |
|---|---|---|---|---|
| 7,039,158 | B1 * | 5/2006 | Janik | G01B 15/02 |
| | | | | 378/50 |
| 7,120,228 | B2 * | 10/2006 | Yokhin | G01N 23/20008 |
| | | | | 378/90 |
| 7,983,386 | B2 * | 7/2011 | Yellepeddi | G01N 23/223 |
| | | | | 378/70 |
| 10,473,598 | B2 * | 11/2019 | Ogata | G01N 23/2204 |
| 11,435,300 | B2 * | 9/2022 | Storer | G01N 1/286 |
| 11,796,492 | B2 * | 10/2023 | Pilliere | G01N 23/2209 |
| 2003/0169846 | A1 * | 9/2003 | Janik | G01N 23/20 |
| | | | | 378/90 |
| 2006/0062350 | A1 | 3/2006 | Yokhin et al. | |
| 2006/0062351 | A1 * | 3/2006 | Yokhin | G01N 23/20008 |
| | | | | 378/86 |
| 2010/0111251 | A1 | 5/2010 | Yellepeddi et al. | |
| 2017/0234814 | A1 * | 8/2017 | Ogata | G01N 23/2206 |
| | | | | 378/44 |
| 2020/0182809 | A1 * | 6/2020 | Storer | G01N 23/207 |
| 2022/0205935 | A1 * | 6/2022 | Pilliere | G01N 23/2206 |
| 2023/0236143 | A1 * | 7/2023 | Zhang | G01N 23/223 |
| | | | | 378/45 |

FOREIGN PATENT DOCUMENTS

| | | | | |
|---|---|---|---|---|
| CN | 101379392 | A | | 3/2009 |
| CN | 101669024 | A | | 3/2010 |
| CN | 104170051 | A | | 11/2014 |
| CN | 104335032 | A | | 2/2015 |
| CN | 108872282 | A | | 11/2018 |
| CN | 110621986 | A | | 12/2019 |
| DE | 4127778 | C2 * | 11/1994 | ............ B82Y 10/00 |
| JP | S63134942 | A * | 6/1988 | |
| WO | WO-2008004344 | A1 * | 1/2008 | ........... G01N 23/223 |

OTHER PUBLICATIONS

Office Action in CN202210103584.X, mailed Oct. 17, 2022, 10 pages.

* cited by examiner

GIXRF

Normal XRF

GEXRF

TXRF

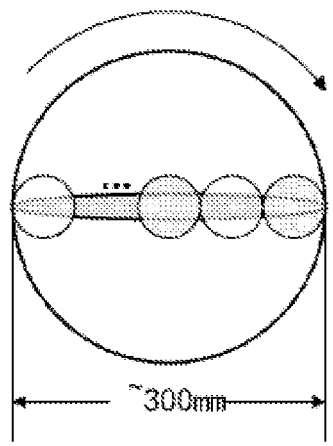
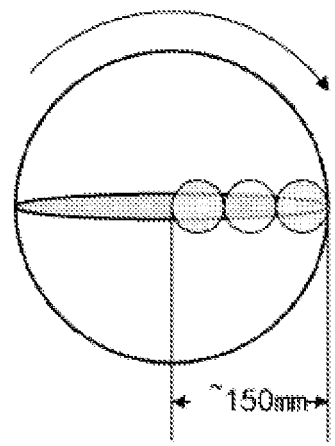
FIG. 7(a)  FIG. 7(b)
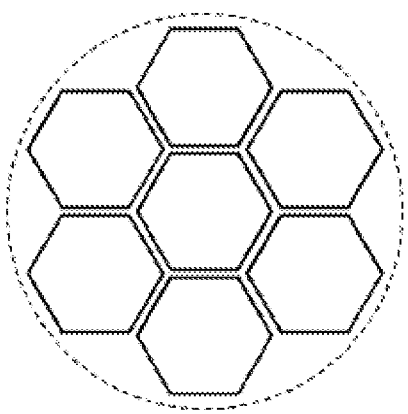
FIG. 7(c)

X-RAY ANALYSIS SYSTEM AND METHOD WITH MULTI-SOURCE DESIGN

CROSS REFERENCE TO RELATED APPLICATIONS

This application claims priority to Chinese Patent Application No. 202210103584.X filed on Jan. 25, 2022, the entire disclosure of which is incorporated herein by reference in its entirety.

TECHNICAL FIELD

The present disclosure relates to a field of X-ray analysis technology, and in particular to an X-ray analysis system and method with multi-source design.

BACKGROUND

The X-ray analysis technology has important applications in material characterization, such as analysis and determination of element composition, surface morphology, thin film thickness, crystal structure, etc. The X-ray analysis technology includes X-ray fluorescence (XRF) analysis, X-ray reflection (XRR) analysis, small angle X-ray scattering (SAX) analysis, X-ray diffraction (XRD) analysis, etc.

The behavior of the X-ray source depends on its energy and target materials, and a ray source with certain energy and certain target material generally only works on specific elements. The existing X-ray analysis system generally only has a single ray source, or even if a plurality of sources are provided, one of them is selected for emission by a selection component.

SUMMARY

In view of this, an objective of the present disclosure is at least partially to provide an X-ray analysis system with multi-source design and an X-ray analysis method with multi-source design.

According to an aspect of the present disclosure, an X-ray analysis system is provided, including: a ray source, the ray source includes a plurality of ray generating devices configured to generate a ray; a detector configured to detect a signal generated due to an analyzed object being irradiated by the ray from the ray source; and a controller configured to control the ray source, so that two or more ray generating devices in the ray source simultaneously generate corresponding rays to irradiate the analyzed object.

Such multi-source design may collect more signals simultaneously, and therefore may enhance the signal to improve a throughput.

The detected signals may include at least one of fluorescence, reflected light, diffracted light, scattered light, etc. The detector includes at least one of: a fluorescence detector configured to detect a fluorescence emitted by the analyzed object due to the analyzed object being irradiated by the ray from at least one of the two or more ray generating devices to perform an X-ray fluorescence (XRF) analysis; a reflected light detector configured to detect a reflected light obtained by the analyzed object reflecting the ray of at least one of the two or more ray generating devices to perform an X-ray reflection (XRR) analysis; a diffracted light detector configured to detect a diffracted light obtained by the analyzed object diffracting the ray of at least one of the two or more ray generating devices to perform an X-ray diffraction (XRD) analysis; and a scattered light detector configured to detect a scattered light obtained by the analyzed object scattering the ray of at least one of the two or more ray generating devices to perform a small angle X-ray scattering (SAX) analysis.

In a case of the fluorescence analysis, the ray source and the detector includes at least one of following configurations: the ray of the at least one of the two or more ray generating devices is configured to be incident onto an analyzed sample in a grazing incidence manner to perform a grazing incidence XRF (GIXRF) analysis; the fluorescence detector is configured to receive a grazing exit fluorescence to perform a grazing exit XRF (GEXRF) analysis; and the ray of the at least one of the two or more ray generating devices is configured to be incident onto the analyzed sample in a non-grazing incidence manner, and the fluorescence detector is configured to receive a non-grazing exit fluorescence to perform a normal XRF analysis.

The X-ray analysis system is configured to simultaneously perform at least two of the GIXRF analysis, the GEXRF analysis, the normal XRF analysis, the XRR analysis, the XRD analysis and the SAX analysis.

Different measurement techniques may be combined in a same measurement tool to perform a plurality of analyses simultaneously. In addition, different techniques may be verified with each other to further improve a measurement accuracy.

In addition, in a case of the XRF analysis, the rays of the two or more ray generating devices are configured to be incident onto the analyzed sample at an incidence angle less than a critical angle, and the fluorescence detector is configured to directly face the analyzed sample to perform a total reflection XRF (TXRF) analysis.

In a case of the TXRF analysis, for example, the analyzed sample is a wafer, the two or more ray generating devices are configured to emit parallel beams to form an elliptical light spot on the analyzed sample, a major axis of the light spot is substantially aligned with a diameter of the wafer, and a minor axis of the light spot corresponds to a diameter of the fluorescence detector.

The X-ray analysis system further includes: a sample stage. The analyzed sample is placed on the sample stage, and the sample stage is configured to translate the analyzed sample so that the rays from the two or more ray generating devices scan the analyzed sample.

According to the embodiments of the present disclosure, the ray source and the detector are not necessarily moved angularly with respect to the sample, but they can be fixed. The sample may be translated for analysis to achieve fast scanning. A system complexity is reduced, which may be advantageous to combine different analysis techniques such as the XRR analysis, the XRD analysis to the same measurement tool.

In the XRR analysis and the SAX analysis, the at least one of the two or more ray generating devices is configured such that the ray emitted by the at least one of the two or more ray generating devices is incident onto the analyzed sample in a grazing incidence manner. In the XRD analysis, the at least one of the two or more ray generating devices is configured such that the emitted ray is incident onto the analyzed sample at a Bragg angle.

The plurality of ray generating devices in the ray source are separately arranged along a circumferential direction of the sample stage, and are configured so that rays emitted by each ray generating device irradiate a same target region of the analyzed sample.

In the XRF analysis, the at least one of the two or more ray generating devices is configured to emit a monochromatic light or a polychromatic light. In the XRR analysis, the XRD analysis or the SAX analysis, the at least one of the two or more ray generating devices is configured to emit the monochromatic light.

In the XRR analysis, the XRD analysis or the SAX analysis, the at least one of the two or more ray generating devices is configured to emit a convergent beam. In the GIXRF analysis, the at least one of the two or more ray generating devices is configured to emit a convergent beam. In the GEXRF analysis and the normal XRF, the at least one of the two or more ray generating devices is configured to emit a parallel beam or a converge beam.

The controller is configured to select the two or more ray generating devices according to a characteristic of the analyzed sample so as to generate the rays simultaneously.

According to another aspect of the present disclosure, an X-ray analysis method is provided, including: generating rays simultaneously from two or more ray generating devices, respectively; irradiating an analyzed object with the generated rays; and detecting a signal generated due to the analyzed object being irradiated by the rays.

The detected signal includes at least one of: a fluorescence emitted due to the analyzed object being irradiated by the ray from at least one of the two or more ray generating devices to perform an X-ray fluorescence analysis, i.e., XRF analysis; a reflected light obtained by the analyzed object reflecting the ray of at least one of the two or more ray generating devices to perform an X-ray reflection analysis, i.e., XRR analysis; a diffracted light obtained by the analyzed object diffracting the ray of at least one of the two or more ray generating devices to perform an X-ray diffraction analysis, i.e., XRD analysis; and a scattered light obtained by the analyzed object scattering the ray of at least one of the two or more ray generating devices to perform a small angle X-ray scattering analysis, i.e., SAX analysis.

In a case of the XRF analysis, the method further includes at least one of: controlling the ray of the at least one of the two or more ray generating devices to be incident onto the analyzed sample in a grazing incidence manner to perform a grazing incidence XRF analysis, i.e., GIXRF analysis; receiving a grazing exit fluorescence to perform a grazing exit XRF analysis, i.e., GEXRF analysis; and controlling the ray of the at least one of the two or more ray generating devices to be incident onto the analyzed sample in a non-grazing incidence manner, and receiving a non-grazing exit fluorescence to perform a normal XRF analysis.

The method further includes: performing at least two of the GIXRF analysis, the GEXRF analysis, the normal XRF analysis, the XRR analysis, the XRD analysis and the SAX analysis simultaneously.

In addition, in the case of the XRF analysis, the method further includes: controlling the rays of the two or more ray generating devices to be incident onto the analyzed sample at an incidence angle less than a critical angle to perform a total reflection XRF (TXRF) analysis.

The method further includes: selecting the two or more ray generating devices according to a characteristic of the analyzed sample to generate the rays simultaneously.

According to the embodiments of the present disclosure, the two or more ray generating devices may simultaneously generate the rays to irradiate the analyzed object and may perform a plurality of analyses, thereby the throughput may be improved.

BRIEF DESCRIPTION OF THE DRAWINGS

The above and other objectives, features and advantages of the present disclosure will become more apparent from the following description of the embodiments of the present disclosure with reference to the accompanying drawings.

FIG. 7(a) to FIG. 7(c) schematically show an example of combining a plurality of detectors to cover an effective detection region of a light spot.

Throughout the accompanying drawings, the same or similar reference numerals indicate the same or similar components.

DETAILED DESCRIPTION OF EMBODIMENTS

The embodiments of the present disclosure will be described below with reference to the accompanying drawings. However, it should be understood that, these descriptions are merely exemplary and are not intended to limit the scope of the present disclosure. Various schematic diagrams according to the embodiments of the present disclosure are shown in the accompanying drawings. These drawings are not drawn to scale, certain details are enlarged and some details may be omitted for clarity of presentation. In addition, in the following descriptions, descriptions of well-known structures and technologies are omitted to avoid unnecessarily obscuring the concept of the present disclosure.

Terms used here are for the purpose of describing specific embodiments only and are not intended to limit the present disclosure. The words "one", "a (an)" and "the" used here should also include the meanings of "more" and "a plurality of", unless the context clearly indicates otherwise. In addition, terms "comprising", "including" and the like used here specify a presence of a feature, a step, an operation and/or a component, but do not preclude a presence or addition of one or more other features, steps, operations or components.

All terms (including technical terms and scientific terms) used here have the meanings as commonly understood by those of ordinary skill in the art, unless otherwise defined. It should be noted that the term used here should be construed to have the meaning consistent with the context of the present description and should not be construed in an idealized or overly rigid manner.

Figure 1:
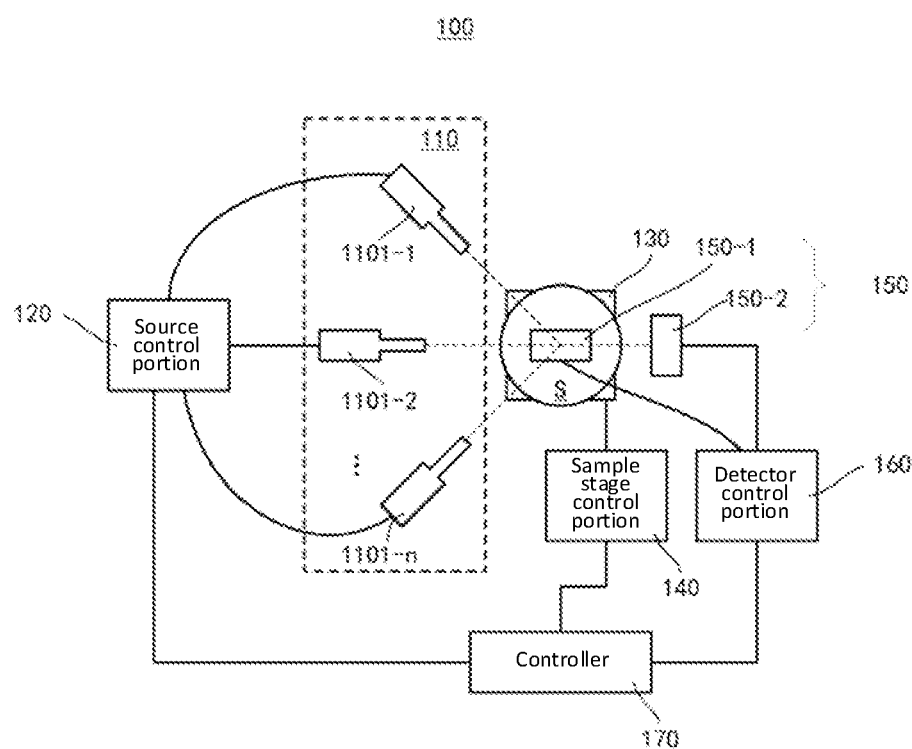
FIG. 1 schematically shows an X-ray analysis system according to an embodiment of the present disclosure.

FIG. 1 schematically shows an X-ray analysis system according to an embodiment of the present disclosure. More specifically, FIG. 1 schematically shows a top view of an X-ray analysis system 100 according to the embodiment.

As shown in FIG. 1, the X-ray analysis system 100 according to the embodiment may include a ray source 110, a detector 150, and a controller 170.

The ray source 110 may generate a ray, such as at least one of X-ray, gamma ray, and the like, for X-ray analysis. Here, the ray source 110 may include a plurality of ray generating devices 1101-1, 1101-2 . . . 1101-n (n is an integer greater than or equal to 2). Each ray generating device may independently generate a corresponding ray, such as the X-ray or the gamma ray. For example, each ray generating device may be an X-ray light tube having a housing, an inside of the housing is vacuum or near vacuum, an electron beam emitter and a target material are arranged inside the housing. The target material is bombarded by an electron beam emitted by the electron beam emitter to generate a ray. By selecting different target materials such as copper (Cu), iron (Fe), molybdenum (Mo), etc., rays having different energies (for example, in KeV) or different wavelengths (or frequencies) may be generated. Each ray generating device 1101-1, 1101-2 . . . 1101-n may emit monochromatic light or polychromatic light. In addition, an intensity of the generated ray may be controlled by controlling a power of the electron beam.

The ray source 110 may include mounting seats for respectively installing each ray generating device 1101-1, 1101-2 . . . 1101-n. Each ray generating device 1101-1, 1101-2 . . . 1101-n may be detachably installed on a corresponding mounting seat. Therefore, each ray generating device 1101-1, 1101-2 . . . 1101-n may be easily replaced. For example, when a fault occurs, or when required (for example, according to a characteristic of an object to be analyzed), each ray generating device may be replaced by a ray generating device with a different characteristic (for example, an X-ray tube emitting a different energy ray or having a different target material). For example, the X-ray generating devices 1101-1, 1101-2 . . . 1101-n may be commercial X-ray tubes available from the market, so that a configuration of the X-ray analysis system 100 may be easily adjusted as required.

The X-ray analysis system 100 may further include a source control portion 120 for controlling an operation of the ray source 110. For example, the source control portion 120 may control an on/off of each ray generating device 1101-1, 1101-2 . . . 1101-n (for example, by a shutter described below), an intensity of the emitted ray, etc. according to a command from the controller 170. For another example, the source control portion 120 may adjust a positioning of each ray generating device 1101-1, 1101-2 . . . 1101-n (by controlling a driving device described below) according to a command from the controller 170.

The rays generated from each ray generating device 1101-1, 1101-2 . . . 1101-n may be guided (for example, through an optical device described below) to a sample S (i.e., an analyzed object) placed on a sample stage 130. For example, the sample S may be a silicon wafer (in which an integrated circuit has not been manufactured or has already been manufactured). The rays from each ray generating device 1101-1, 1101-2 . . . 1101-n may be focused on a same region of the sample S. Certainly, the rays may also be focused on different regions of the sample S. The X-ray analysis system 100 may further include a driving device (not shown) to focus the rays to the sample S. For example, the driving device may drive at least one of the optical device, the sample stage, etc. to perform translation, rotation, pitching and other actions to achieve required focusing and incidence and/or exit angles.

The X-ray analysis system 100 may further include a sample stage control portion 140 for controlling an operation of the sample stage 130. For example, the sample stage control portion 140 may adjust a positioning of the sample stage 130 (by controlling the driving device) according to a command from the controller 170.

The sample S may reflect and scatter the ray from the ray source 110, and the reflected light and/or scattered light may be used for X-ray reflection (XRR) analysis and/or small angle X-ray scattering (SAX) analysis. For example, when an X-ray is incident (for example, grazing incident) onto a surface of a sample to be measured at a small angle, the XRR analysis may determine a thin film density, a thickness, a roughness, etc. (for example, of a thin film sample), and the SAX analysis may determine a size, a height, a width, etc. of a particle/periodic structure (for example, of a surface periodic structure). Additionally or alternatively, the sample S may diffract the ray from the ray source 110 (especially a ray incident at a specific incidence angle, such as a Bragg angle), and the diffracted light may be used for X-ray diffraction (XRD) analysis. For example, the XRD analysis may determine a crystal structure, a lattice constant, a strain, etc. of the sample S. Additionally or alternatively, the sample S is irradiated by the ray from the ray source 110, and its inner orbital electrons may be excited by the ray. In order to fill a vacancy generated therefrom, higher energy level electrons may jump to a lower energy level orbit, thereby releasing corresponding energy (that is, emitting corresponding fluorescence). The released energy (i.e., the emitted fluorescence) is related to an energy level structure of the sample S, and thus may be used to reflect a material characteristic of the sample S. Here, the term "fluorescence" may refer to a radiation with lower energy being released due to an absorption of a radiation with a specific energy. The sample S may generate fluorescence with different energies in response to irradiation of rays with different energies. Such fluorescence may be used to perform X-ray fluorescence (XRF) analysis. For example, the XRF analysis may determine an element composition of the sample S.

The detector 150 may detect a signal generated due to the sample S being irradiated by the ray, such as at least one of the reflected light, the scattered light, the diffracted light and the fluorescence, etc. In FIG. 1, detectors 150-1 and 150-2 at different positions are schematically shown. The detector 150-1 is shown as being provided above the sample S (for example, the detector 150-1 is provided in a normal direction relative to the sample S), and more specifically, the detector 150-1 is provided above a region (that is, a spot where the rays are focused) where the sample S is irradiated by the rays. In this case, it is advantageous to detect the fluorescence emitted by the sample S under X-ray irradiation. Therefore, the detector 150-1 may include an XRF detector to detect the fluorescence emitted by the sample S. The XRF detector has an energy resolution, that is, the XRF detector may receive fluorescence within a certain energy range and measure intensities of the fluorescence with different energies. Therefore, according to a detection result of the XRF detector, a fluorescence spectrum may be obtained. According to the obtained spectrum, components of the sample S, contents of corresponding components and other material characteristics may be obtained through analysis. For example, the XRF detector may include a silicon drift detector (SDD). In addition, the detector 150-2 is shown as being provided obliquely with respect to the sample S. In addition to receiving the fluorescence, the oblique arrangement is also advantageous to receiving the reflected light, the scattered light and the diffracted light, and therefore may include at least one of the XRR detector, the SAX detector and the XRD detector. The detectors may be composed of the same type of detectors.

It should be noted that although two detectors 150-1 and 150-2 are shown in FIG. 1, the present disclosure is not limited to this. A single detector may be provided, or more detectors may be provided, which may be further clarified according to the following descriptions.

The driving device in the X-ray analysis system 100 may further drive the detector 150 so that the detector 150 may receive at least one of the reflected light, the scattered light, the diffracted light, the fluorescence, etc. Hereinafter, a relative positioning among the ray source 110, the sample stage 130 (or the sample S placed on the sample stage 130) and the detector 150 will be further described.

The X-ray analysis system 100 may further include a detector control portion 160 for controlling an operation of the detector 150. For example, the detector control portion 160 may apply an appropriate offset to the detector 150 according to a command from the controller 170, and perform appropriate signal processing (such as filtering, noise reduction, converting a signal of the detector 150 to a signal suitable for being processed by the controller 170, etc.) on the signal of the detector 150. As another example, the detector control portion 160 may adjust a positioning of the detector 150 (by controlling the driving device) according to a command from the controller 170.

The source control portion 120, the sample stage control portion 140 and the detector control portion 160 may each include a processor or microprocessor, a field programmable gate array (FPGA), an application specific integrated circuit (ASIC), a single chip computer, etc., and may be respectively integrated into the ray source 110, the sample stage 130 and the detector 150, or may be implemented in the controller 170, or may be partially integrated into the ray source 110, the sample stage 130 and the detector 150, and partially implemented in the controller 170.

The controller 170 may control an overall operation of the X-ray analysis system 100. The controller 170 may respectively control operations of the ray source 110, the sample stage 130, and the detector 150 (through the source control portion 120, the sample stage control portion 140, and the detector control portion 160). For example, the controller 170 may control the driving device so that the ray source 110, the sample stage 130 and the detector 150 are optically aligned, that is, the ray emitted from the ray source 110 may be incident onto a target region of the sample S placed on the sample stage 130, and the reflected light, the scattered light, the diffracted light and/or the fluorescence from the sample S may be received by the detector 150. The controller 170 may control the ray source 110 to select at least two (for example, three or more) of the ray generating devices 1101-1, 1101-2 . . . 1101-n to be switched on simultaneously, and the rays emitted by the switched-on ray generating devices may be incident onto the target region of the sample S. The controller 170 may select different ray generating devices to be switched on according to a predetermined standard or user input (for example, according to a characteristic of the sample, or according to a purpose of analysis).

The controller 170 may further control the ray source 110, so that the switched-on ray generation device may generate a ray having a certain intensity, so that the detector 150 may obtain a detection signal with good quality (for example, a signal-to-noise ratio thereof is higher than a predetermined threshold). The controller 170 may generate an analysis result (e.g., at least one of the components of the sample S, contents of each component, a thickness of a surface film, the crystal structure, etc.) according to a detection signal of the detector 150. The controller 170 may send the analysis result to a display device (not shown) for display, store the analysis result in a storage device, or send the analysis result to a remote server. The controller 170 may further control the sample stage 130 so that sample S may be scanned to detect and analyze different regions of the sample S.

The controller 170 may be implemented as a general-purpose or special-purpose computer. The general-purpose or special-purpose computer may execute program instructions to perform various operations described in the present disclosure. Such program instructions may be stored in a local memory or downloaded from a remote memory via a wired or wireless connection. Alternatively, the operations described in the present disclosure may be performed by the controller 170 requesting a remote server, or some of these operations may be performed by the controller 170 and some others may be performed by other controllers or servers networked with the controller 170.

Throughput is one of the important indicators in the X-ray analysis technology. According to the embodiments of the present disclosure, two or more ray generating devices in the ray source 110 may be switched on simultaneously. Therefore, the detected signal may be enhanced (for example, a signal strength is increased and/or a signal type is increased, etc.) to reduce a measurement time and thus increasing a throughput. In addition, measurement results of different ray generating devices, especially results of different analysis techniques, may be mutually verified to further improve a measurement accuracy.

According to the embodiments of the present disclosure, the switched-on ray generating devices of the ray generating devices 1101-1, 1101-2 . . . 1101-n may work in a monochromatic or polychromatic manner. Specifically, one or more of the switched-on ray generating devices may generate monochromatic light. Alternatively, one or more of the switched-on ray generating devices may generate polychromatic light. Alternatively, one or more ray generating devices may generate polychromatic light or white light, and (one or more) selected wavelengths or bands of the generated polychromatic light or white light is selected in combination with a wave filter.

The controller 170 may control the driving device so that the ray emitted from the ray source may irradiate the sample S at a certain incidence angle, and the detector 150 may detect the fluorescent/reflected ray emitted from the sample S at a certain exit angle. According to the embodiments of the present disclosure, the incidence angle/exit angle may be provided in a large range from almost 0 degrees (grazing incidence or grazing exit) to 90 degrees (normal incidence or normal exit) or almost 90 degrees.

In the following, examples of a relative positioning among the ray source, the sample and the detector for different analysis techniques will be given.

FIG. 2(*a*) to FIG. 2(*d*) schematically show a relative positioning among a ray source, a sample and a detector when performing XRF analysis.

As shown in FIG. 2(*a*), the ray from the ray source 110 may be incident onto the sample S at a very small angle relative to a surface of the sample S, which may be referred to as grazing incidence (GI). The rays from the ray source 110 may be focused on (target region of) the sample S in a convergence manner. Such convergent ray beam may be obtained, for example, by focusing the rays emitted by the ray generating devices (1101-1, 1101-2 . . . or 1101-n) through the optical device in the ray source 110. In a case of GI, for convenience, a minimum angle of the ray in the ray beam relative to the surface of the sample S is taken as an incidence angle $\theta_{inc}$. The incidence angle $\theta_{inc}$ may be very small, for example, only a few degrees, or even close to 0°, such as about 0.1° to 1°. On the other hand, the incidence angle $\theta_{inc}$ may be (slightly) greater than a critical angle ($\theta_c$), and thus no total reflection occurs. The critical angle $\theta_{inc}$ may be related to a material of the sample S, an energy (or wavelength) of an incident ray, etc.

In a case of GI, the detector 150 may be configured to directly face the sample S (target region), for example, provided in a normal direction of the sample S, and may collect the fluorescence generated due to the sample S being irradiated by the ray.

The XRF analysis configuration may be referred to as grazing incidence XRF (GIXRF).

Figure 2A:
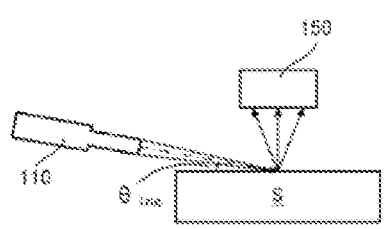
FIG. 2(a) to FIG. 2(d) schematically show a relative positioning among a ray source, a sample and a detector when performing X-ray fluorescence (XRF) analysis.

In FIG. 2(a), the ray source 110 is schematically shown as a single ray generating device. However, as described above, more than one ray generation device (for example, rays with different wavelengths or wavebands may be emitted to analyze different elements simultaneously; or rays with the same wavelength or waveband may be emitted to enhance the signal strength) may be switched on simultaneously. The switched-on ray generating devices may irradiate the same target region of the sample S in GI manner from different positions in a circumferential direction of the sample S. The fluorescence generated due to the sample S being irradiated by the ray generating devices may be collected by a single detector 150, which will be further described in detail below.

Figure 2C:
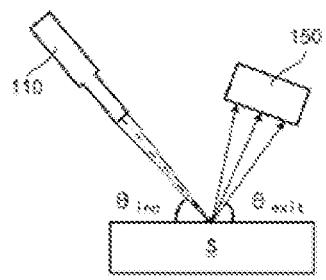
Figure 2B:
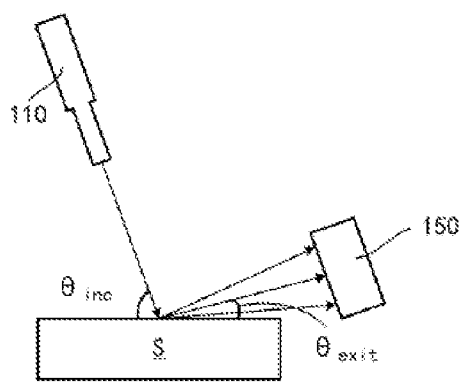

As shown in FIG. 2(b), the detector 150 may be provided at a very small angle relative to the surface of the sample S, which may be referred to as grazing exit (GE). In a case of GE, an angle of an optical axis of the detector 150 relative to the surface of the sample S may be used as an exit angle $\theta_{exit}$. The exit angle $\theta_{exit}$ may be very small, such as in a range of 0° to a few degrees.

The ray from the ray source 110 may be incident at a large angle $\theta_{inc}$ (a non GI incidence angle, even normal incidence, i.e., 90° incidence angle) relative to the surface of the sample S. Here, the angle $\theta_{inc}$ may be provided so that the detector 150 in the GE configuration may detect a signal with good quality (for example, a signal-to-noise ratio thereof is greater than a certain threshold). In addition, in this case, in addition to the convergent beam, an incident ray beam may also be a parallel beam (for example, obtained by adjusting the optical device).

The XRF analysis configuration may be referred to as grazing exit XRF (GEXRF).

Similarly, more than one ray generating device may be switched on simultaneously. The switched-on ray generating devices may irradiate the same target region of the sample S from different positions in the circumferential direction of the sample S. For example, the incidence angles of the switched-on ray generating devices may be provided close to 90° or even 90° (normal incidence) so as to be close to a normal of the target region of the sample S. A single detector 150 may be used to collect grazing exit fluorescence generated due to the sample S being irradiated by the ray generating devices.

FIG. 2(c) shows a configuration between GI and GE. Specifically, the ray from the ray source 110 may be incident at a large angle $\theta_{inc}$ (a non GI incidence angle, and less than 90°) relative to the surface of the sample S, and the detector 150 is provided at a large angle $\theta_{exit}$ (greater than GE exit angle until 90°) relative to the surface of sample S. The ray source 110 and the detector 150 may be positioned relative to the sample S to collect a signal with good quality. Similarly, in this case, in addition to the convergent beam, an incident ray beam may also be a parallel beam.

The XRF analysis configuration may be referred to as normal XRF.

Similarly, more than one ray generating device may be switched on simultaneously. The switched-on ray generating devices may irradiate the same target region of the sample S from different positions in the circumferential direction of the sample S. A single detector 150 may be used to collect fluorescence generated due to the sample S being irradiated by the ray generating devices.

Figure 2D:
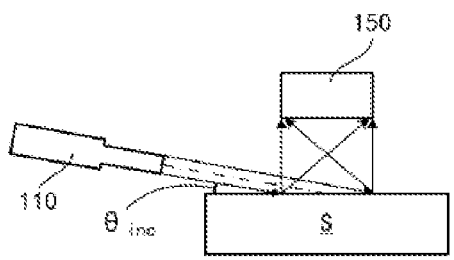

As shown in FIG. 2(d), when the incidence angle $\theta_{inc}$ is (slightly) less than the critical angle $\theta_{inc}$, a total reflection may occur. In this case, the incident ray beam may be a parallel beam. The detector 150 may be provided to directly face the sample S.

The XRF configuration may be referred to as TXRF.

Similarly, more than one ray generating device may be switched on simultaneously. The switched-on ray generating devices may irradiate the same target region of the sample S from different positions in the circumferential direction of the sample S. A single detector 150 may be used to collect fluorescence generated due to the sample S being irradiated by the ray generating devices.

Figure 3A:
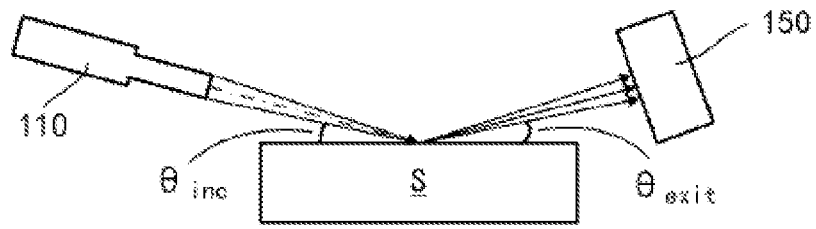
FIG. 3(a) schematically shows a relative positioning among a ray source, a sample and a detector when performing X-ray reflection (XRR) analysis.

FIG. 3(a) schematically shows a relative positioning among a ray source, a sample and a detector when performing XRR analysis.

As shown in FIG. 3(a), in the XRR analysis, the reflected light is collected, thus $\theta_{exit}=\theta_{inc}$. Here, the incidence angle $\theta_{inc}$ may be provided as being (slightly) less than the critical angle $\theta_c$, but is not limited to this. For example, the incidence may be the grazing incidence as described below. The incident ray beam may be a convergent beam (the incidence angle $\theta_{inc}$ may be defined by a minimum angle of the ray in the incident ray beam relative to the surface of the sample S), and therefore covering a certain angle range. Therefore, more required data may be obtained through a single irradiation without a need to provide moving parts in the system to change the incidence angle for angle scanning (at the same time, there is no need to move the detector to correspond to the change of the incidence angle). Therefore, the XRR according to the embodiments of the present disclosure may also be referred to as fast XRR.

Similarly, more than one ray generating device may be switched on simultaneously. The switched-on ray generating devices may irradiate the same target region of the sample S from different positions in the circumferential direction of the sample S at different incidence angles. Different detectors may be provided to respectively receive reflected light at different angles, or a single detector may be provided to receive all the reflected light, which will be further described below.

The above-mentioned XRR configuration may also be applied to the SAX configuration, thus the SAX configuration will not be described separately.

Figure 3B:
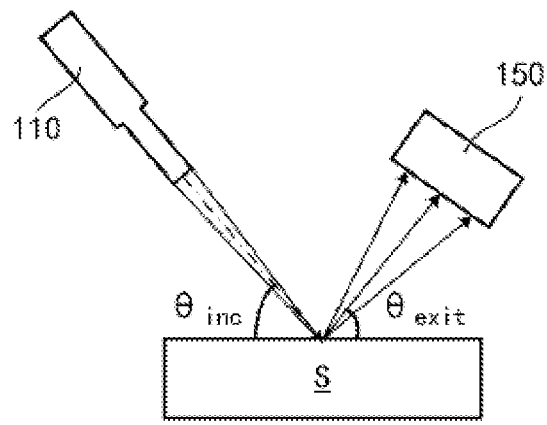
FIG. 3(b) schematically shows a relative positioning among a ray source, a sample and a detector when performing X-ray diffraction (XRD) analysis.

FIG. 3(b) schematically shows a relative positioning among a ray source, a sample and a detector when performing XRD analysis.

As shown in FIG. 3(b), in the XRD analysis, the incidence angle $\theta_{inc}$ is related to the crystal structure, etc., of the sample S. For example, the incidence angle $\theta_{inc}$ may be provided as a Bragg angle $\theta_B$ of the sample S. The Bragg angle $\theta_B$ is related to the material of the sample S and the energy of the incident ray, etc. The detector 150 may be provided as $\theta_{exit}=\theta_{inc}$. The incident ray beam may be a convergent beam (the incidence angle $\theta_{inc}$ may be defined by an angle of a central ray in the incident ray beam relative to the surface of the sample S), and thus covering a certain angle range. Therefore, more required data may be obtained by a single irradiation without a need to provide moving parts in the system to change the incidence angle for angle scanning (at the same time, there is no need to move the detector to correspond to the change of the incidence angle). Therefore, the XRD according to the embodiments of the present disclosure may also be referred to as fast XRD.

In the XRR analysis and the XRD analysis, the detectors 150 detect the reflected light or the diffracted light, thus the detectors may be the same type of detectors, such as ray detectors that may detect the corresponding rays.

Figure 3C:
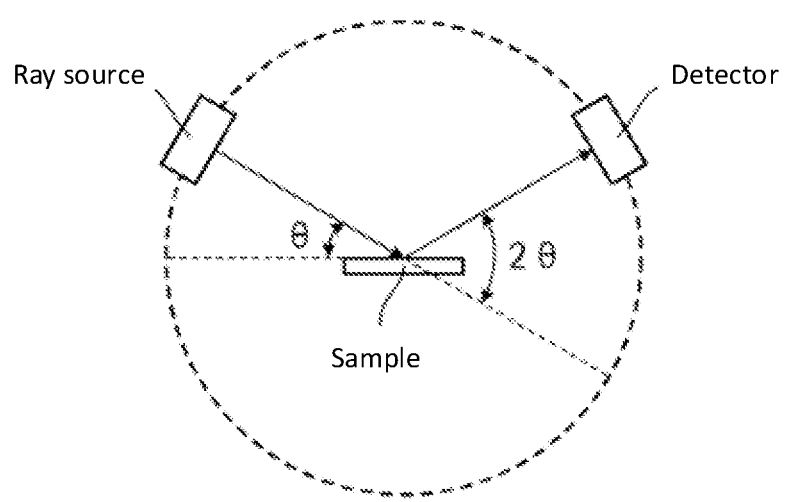
FIG. 3(c) schematically shows a conventional XRR/XRD configuration as a comparative example.

FIG. 3(c) schematically shows a conventional XRR/XRD configuration as a comparative example.

As shown in FIG. 3(c), in the conventional XRR/XRD configuration, an angle scanning is required. Specifically, the ray source is moved by a moving part to change the incidence angle $\theta$ (in a certain extent). Simultaneously, the detector is moved by a moving part so that the exit angle is equal to the incidence angle, so as to receive the reflected light or the diffracted light. Therefore, the moving parts are required. On the one hand, this movement forces the requirements of the incident beam spot to be reduced, and on the other hand, the complexity is increased, thus limiting a possibility of using a plurality of ray generation devices for combination.

According to the embodiments of the present disclosure, different ray generating devices in the ray source may be provided for different analyses. For example, a ray generating device may be provided for the XRF analysis, thus its incidence angle may be provided, for example, as being slightly greater than the critical angle $\theta_c$ (in a case of GIXRF); a ray generating device may be provided for the XRR analysis, thus its incidence angle may be provided, for example, as being slightly less than the critical angle $\theta_c$; another ray generation device may be provided for the XRD analysis, thus its incidence angle may be provided, for example, as the Bragg angle $\theta_B$. The ray generating devices may be fixed in angular positions. It is only necessary to translate the sample through the sample stage to realize the scanning of the sample without changing the incidence angle by moving parts such as a goniometer (angular movement relative to the surface of the sample) as shown in FIG. 3(c).

According to the embodiments of the present disclosure, the XRF (including the GIXRF, the normal XRF, and the GEXRF), the XRR/SAX, and the XRD may be flexibly combined. Specifically, one or more of the ray generating devices 1101-1, 1101-2 . . . 1101-$n$ of the ray source 110 may be configured to perform one analysis of the XRF (including the GIXRF, the normal XRF, and the GEXRF), the XRR/SAX, and the XRD, while another one or more ray generating devices may be configured to perform another analysis. The detector may be configured correspondingly according to the analysis technique to be performed. It should be noted that in order to meet requirements of different analysis techniques or different angles, the detector may include a plurality of detectors of different types and/or different positioning.

Hereinafter, a combination example of different analysis techniques will be described by taking three radiation generating devices 1101-1, 1101-2, and 1101-3 being simultaneously switched on in the radiation source 110 as an example.

The three ray generating devices may be used for the XRF analysis, but their respective incidence angles may be provided differently, and thus different configurations may be realized.

TABLE 1

Combinations of different XRF techniques

| Case | 1101-1 | 1101-2 | 1101-3 |
|---|---|---|---|
| 1 | GIXRF | GIXRF | GIXRF |
| 2 | GIXRF | GIXRF | Normal XRF |
| 3 | GIXRF | Normal XRF | Normal XRF |
| 4 | Normal XRF | Normal XRF | Normal XRF |
| 5 | GEXRF | GIXRF | GIXRF |
| 6 | GEXRF | GEXRF | GIXRF |
| 7 | GEXRF | GEXRF | GEXRF |
| 8 | GEXRF | GEXRF | Normal XRF |
| 9 | GEXRF | Normal XRF | Normal XRF |
| 10 | TXRF | TXRF | TXRF |

Each of the ray generating devices 1101-1, 1101-2 and 1101-3 may generate monochromatic light or polychromatic light, or white light (as described above, light with a specific wavelength or band may be selected in combination with the filter), and the combination between different XRF techniques may be achieved as shown in the above table. Each of the ray generating devices 1101-1, 1101-2 and 1101-3 may be provided as one of the GIXRF configuration, the GEXRF configuration and the normal XRF configuration, and the ray generating devices with different configurations may be flexibly combined as shown in the above table. A single detector or a plurality of detectors may be provided as needed. Signals (for example, detected by a single detector) generated according to the rays emitted by different ray generating devices may be collected simultaneously, or signals (for example, detected by different detectors) generated according to the rays emitted by different ray generating devices may be combined.

In addition, Table 1 further shows a special case, i.e., the case 10. As described above, in the case of TXFR, the parallel beam is incident onto the sample S with the incidence angle less than the critical angle $\theta_c$, resulting in a large light spot on the sample S. Therefore, in general, the TXRF is not combined with other analysis techniques.

Figure 4:
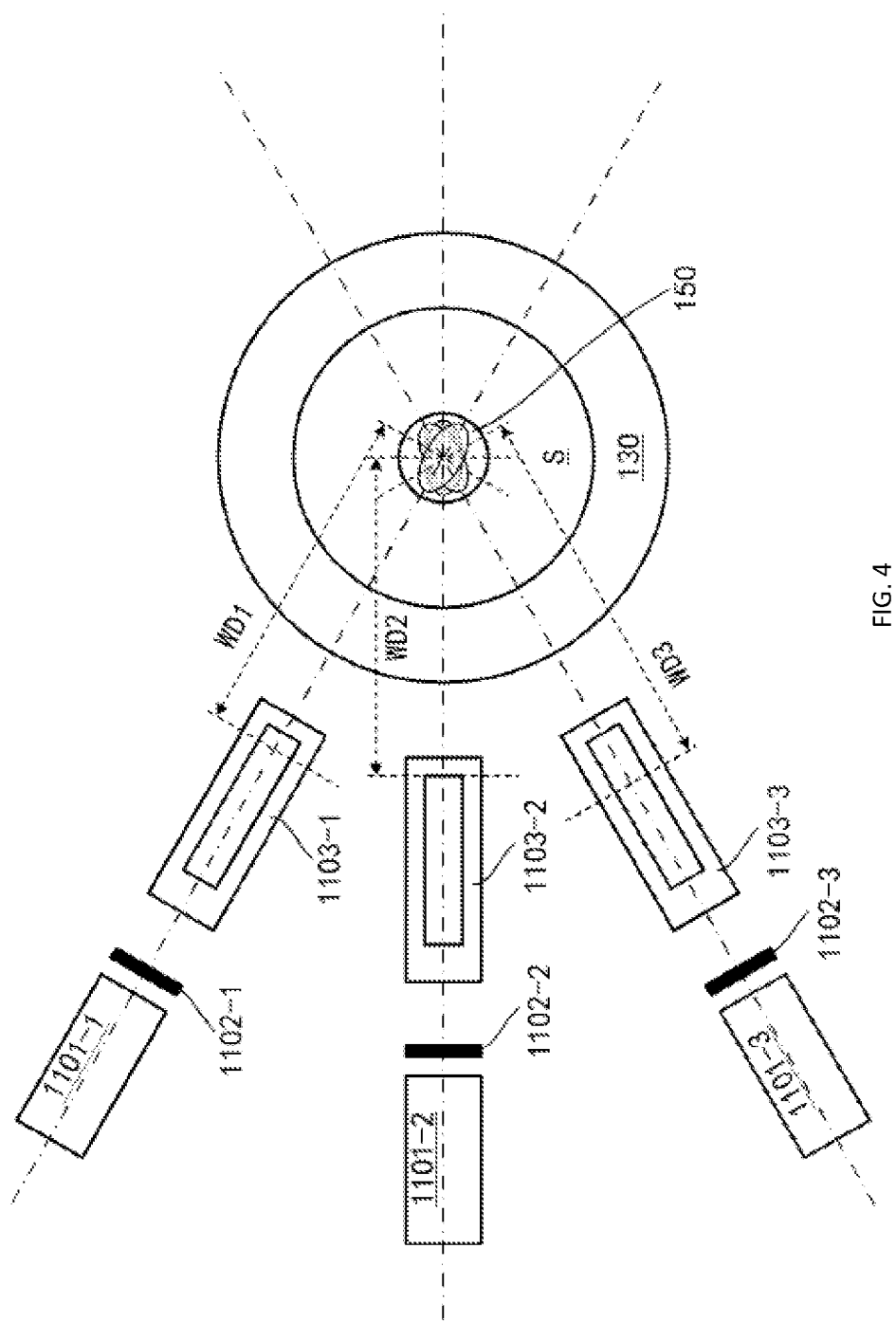
FIG. 4 schematically shows a top view of a 3×GIXRF configuration according to an embodiment of the present disclosure.

FIG. 4 schematically shows a top view of a 3×GIXRF configuration according to an embodiment of the present disclosure (that is, all 3 ray generating devices are GIXRF configurations).

As shown in FIG. 4, the ray generating devices 1101-1, 1101-2 and 1101-3 are positioned separately from each other along the circumferential direction of the sample stage 130, and respectively emit rays to irradiate the sample S placed on the sample stage 130. Shutters 1102-1, 1102-2, 1102-3 and optical devices 1103-1, 1103-2 and 1103-3 are respectively provided for each of the ray generating devices 1101-1, 1101-2 and 1101-3. (For example, under a control of the above-mentioned source control portion 120 and/or the controller 170), the shutters 1102-1, 1102-2, 1102-3 may control a passage or non-passage of the rays from corresponding ray generating devices 1101-1, 1101-2, and 1101-3, and the optical devices 1103-1, 1103-2, and 1103-3 may control optical behaviors of the rays from the corresponding ray generating devices 1101-1, 1101-2, and 1101-3, such as deflection, focusing, etc. Here, each of the optical devices 1103-1, 1103-2 and 1103-3 may realize different working distances (WD) WD1, WD2 and WD3, and may converge the rays emitted by the corresponding ray generating devices 1101-1, 1101-2 and 1101-3 to the same region.

Each of the ray generating devices 1101-1, 1101-2 and 1101-3 (in combination with the corresponding shutters 1102-1, 1102-2, 1102-3 and optical devices 1103-1, 1103-2 and 1103-3) may be positioned to realize the grazing incidence (the incidence angles of the rays from each of the ray generating devices do not have to be the same). As described above, the positioning may be fixed at least in a same batch testing (for example, for a same type of analyzed samples, such as a wafer of silicon material). In addition, the sample stage 130 may be moved so that the sample S placed on the sample stage 130 may be aligned with the light spot focused by the rays from each of the ray generating devices 1101-1, 1101-2 and 1101-3. In FIG. 4, the light spots irradiated on the sample S by each of the ray generating devices 1101-1, 1101-2 and 1101-3 are shown schematically in an ellipse. The light spot may be elliptical, and a major axis of the light spot may pass through a focus point. The sample S may be translated through the sample stage 130, so that the light spot may be scanned in the surface of the sample S.

The detector 150 may be configured to directly face the light spot on the sample S. In the drawing, an effective detection region of the detector 150 is schematically shown in a circle, which may cover the light spot on the sample S. As described below, such effective detection region may be realized by a single detector (for example, when the light spot is small) or by a plurality of detectors (for example, when the light spot is large), which will be described in further detail below. Certainly, the effective detection region of the detector 150 is not limited to the circle, but may also be of other shapes.

Figure 5:
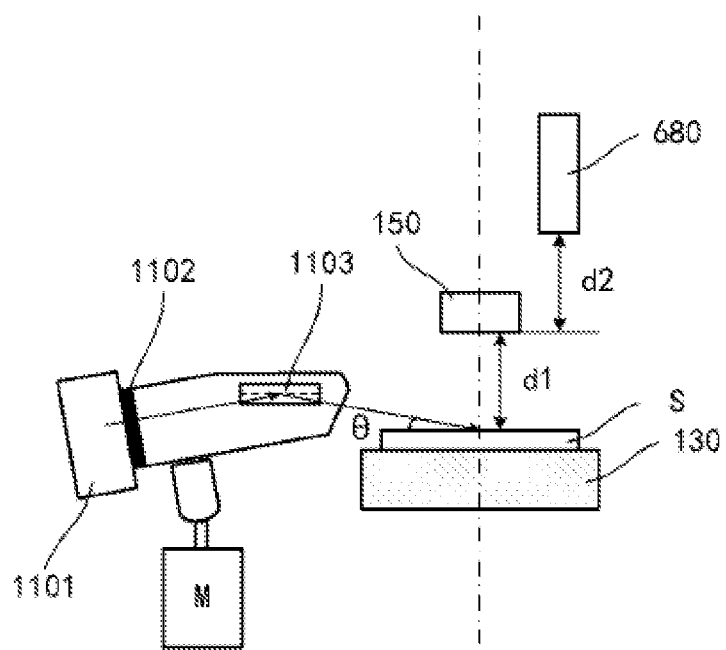
FIG. 5 schematically shows a side view of a GIXRF configuration according to an embodiment of the present disclosure.

FIG. 5 schematically shows a side view of a GIXRF configuration according to an embodiment of the present disclosure. Due to the side view, only one ray generating device, such as 1101, and a corresponding shutter 1102 and optical device 1103 are shown in FIG. 5. A certain incidence angle θ may be achieved through a seat M. As described above, such positioning may remain unchanged in measurements of at least one batch.

In addition, a Z-axis sensor 680 may also be provided to sense a position of the sample S surface on a Z-axis (in a vertical direction). For example, the sample S may have warping and the like. The Z-axis sensor 680 may ensure that the detector 150 measures the fluorescence from the sample S at a substantially constant distance d1 from the spot on the surface of the sample S. The Z-axis sensor 680 may be provided as being further away from the sample S by a distance d2 than the detector 150.

As described above, the effective detection region of the detector may be realized by combining a plurality of detectors, especially when the size of the light spot is large. For example, in the case of TXRF, the parallel beam is incident onto the sample at a very small angle, thus the light spot is large.

Figure 6:
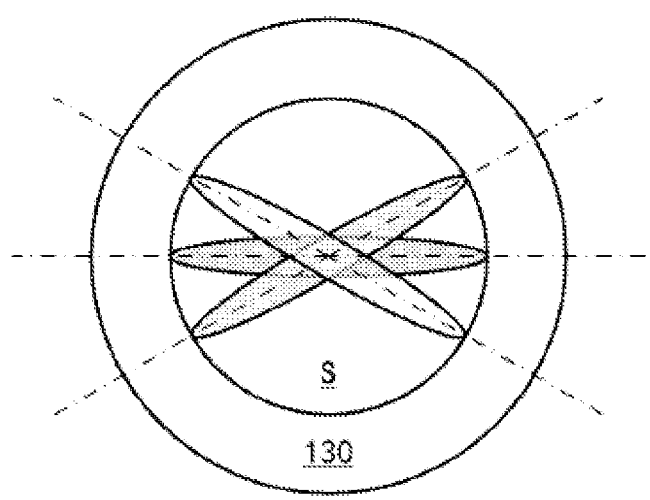
FIG. 6 schematically shows light spots formed on a sample by rays.

FIG. 6 schematically shows light spots on a sample S placed on the sample stage 130 irradiated by rays from three ray generating devices. As shown in FIG. 6, in the case of TXRF, by controlling a relative positioning and the optical device, the light spot on the sample S may be elliptical, a major axis of the light spot may be substantially the same as a diameter of the sample S (for example, a wafer), and a minor axis of the light spot may be equivalent to a diameter of a single detector (for example, substantially equal or slightly smaller).

FIG. 7(a) and FIG. 7(b) schematically show an example of combining a plurality of detectors to cover the effective detection region of the light spot. As shown in FIG. 7(a), the plurality of detectors may be arranged in a straight line, and the detectors arranged in this way may be aligned with the major axis of the elliptical light spot (in the case of TXRF, corresponding to the diameter of the wafer). The detector may rotate 180° relative to the wafer to scan an entire wafer surface. Alternatively, as shown in FIG. 7 (b), arranged detectors may be aligned with half of the major axis of the elliptical light spot (in the case of TXRF, corresponding to a radius of the wafer). The detectors may rotate 360° relative to the wafer to scan the entire wafer surface.

FIG. 7(c) schematically shows another example of combining a plurality of detectors. As shown in FIG. 7(c), a single detector may have a detection region different from a circle. Although a hexagon is taken as an example in the drawing, the present disclosure is not limited to this, and the detection region of the single detector may be other shapes, such as a square, etc. By closely arranging a plurality of detectors, a required effective detection region, such as a substantially circle shape shown by a dotted circle in FIG. 7(c), may be achieved.

The present disclosure is not limited to combinations of different XRF techniques, the XRF techniques may also be combined with the XRR technique, the XRD technique, etc.

TABLE 2

Combinations of XRF technique and XRR technique

| Case | 1101-1 | 1101-2 | 1101-3 |
|---|---|---|---|
| 1 | GIXRF | GIXRF | GIXRR |
| 2 | GIXRF | GIXRR | GIXRR |
| 3 | Normal XRF | Normal XRF | GIXRR |
| 4 | Normal XRF | GIXRR | GIXRR |
| 5 | GEXRF | GEXRF | GIXRR |
| 6 | GEXRF | GIXRR | GIXRR |

Note:
(1) GIXRR represents grazing incidence XRR;
(2) GIXRR may be replaced by GISAX.

TABLE 3

Combinations of XRF technique and XRD technique

| Case | 1101-1 | 1101-2 | 1101-3 |
|---|---|---|---|
| 1 | GIXRF | GIXRF | XRD |
| 2 | GIXRF | XRD | XRD |
| 3 | Normal XRF | Normal XRF | XRD |
| 4 | Normal XRF | XRD | XRD |
| 5 | GEXRF | GEXRF | XRD |
| 6 | GEXRF | XRD | XRD |

TABLE 4

Combinations of XRF technique, XRR technique, and XRD technique

| Case | 1101-1 | 1101-2 | 1101-3 |
|---|---|---|---|
| 1 | GIXRF | GIXRR | XRD |
| 2 | Normal XRF | GIXRR | XRD |

Certainly, the XRR technique and the XRD technique may also be flexibly combined.

TABLE 5

Combinations of XRR technique and XRD technique

| Case | 1101-1 | 1101-2 | 1101-3 |
|---|---|---|---|
| 1 | GIXRR | GIXRR | GIXRR |
| 2 | GIXRR | GIXRR | XRD |
| 3 | GIXRR | XRD | XRD |
| 4 | XRD | XRD | XRD |

In a case of XRR and XRD, monochromatic light may be used, and the detector may be an area detector.

FIG. 8(a) to FIG. 8(f) schematically show schematic configurations of some combinations.

Figure 8A:
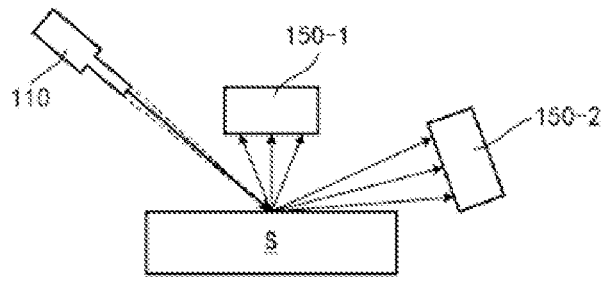
FIG. 8(a) to FIG. 8(f) schematically show schematic configurations of combinations of different analysis techniques.

FIG. 8(a) schematically shows a combination of GEXRF+normal XRF. As shown in FIG. 8 (a), the ray from the ray source 110 may be incident onto the sample S at a large angle (a non GI incidence angle), the detector 150-1 may be configured to detect the fluorescence that is not grazing exit (normal XRF, in this example, the detector 150-1 may directly face the sample S), and the detector 150-2 may be configured to receive the grazing exit fluorescence (GEXRF).

Figure 8B:
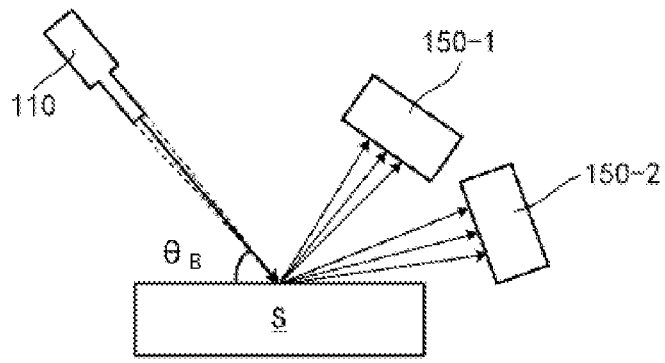

FIG. 8(b) schematically shows a combination of GEXRF+XRD. As shown in FIG. 8 (b), the ray from the ray source 110 may be incident onto the sample S at the Bragg angle $\theta_B$. The detector 150-1 may be configured to receive the diffracted light (XRD, the exit angle=the incidence angle=$\theta_B$), and the detector 150-2 may be configured to receive the grazing exit fluorescence (GEXRF).

Figure 8C:
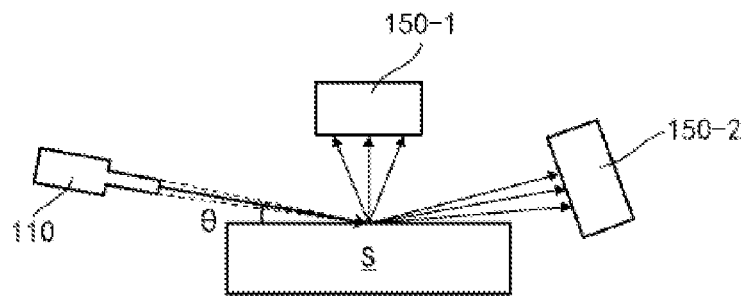

FIG. 8(c) schematically shows a combination of GIXRF+XRR. As shown in FIG. 8 (c), the ray from the ray source 110 may be grazing incident onto the sample S at a small angle θ. The detector 150-1 may be configured to receive the fluorescence (GIXRF, in this example, the detector 150-1 may directly face the sample S), and the detector 150-2 may be configured to receive the reflected light (XRR).

Figure 8D:
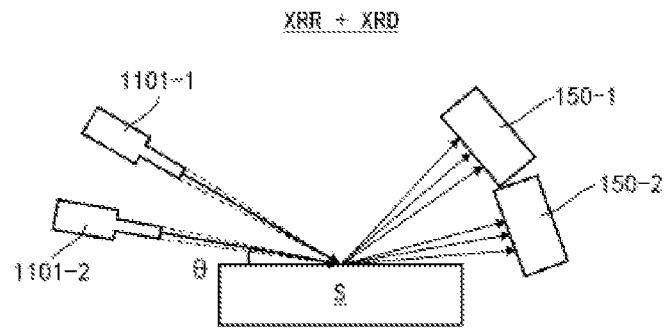

FIG. 8(d) schematically shows a combination of XRR+XRD. As shown in FIG. 8 (d), the ray from the ray generating device 1101-1 may be incident onto the sample S at the Bragg angle $\theta_B$, and the detector 150-1 may be configured to receive the diffracted light (XRD); the ray from the ray generating device 1101-2 may be grazing incident onto the sample S at a small angle θ (for example, slightly less than the critical angle $\theta_c$), and the detector 150-2 may be configured to receive the reflected light (XRR). As described above, the ray beam may be the convergent beam, and the angle scanning is not required.

Figure 8E:
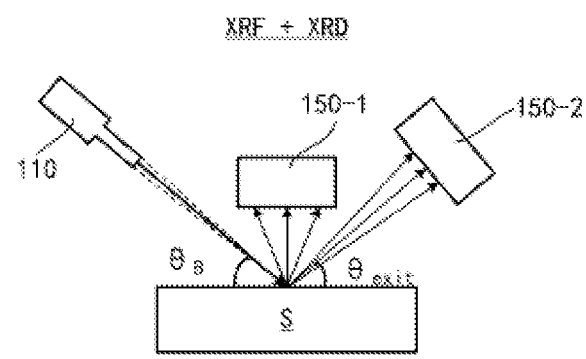

FIG. 8(e) schematically shows a combination of XRF+XRD. As shown in FIG. 8(e), the ray from the ray source 110 may be incident onto the sample S at the Bragg angle $\theta_B$. The detector 150-1 may be configured to receive the fluorescence (normal XRF, in this example, the detector 150-1 may directly face the sample S), and the detector 150-2 may be configured to receive the diffracted light (XRD, the exit angle $\theta_{exit}$=the incidence angle=$\theta_B$).

Figure 8F:
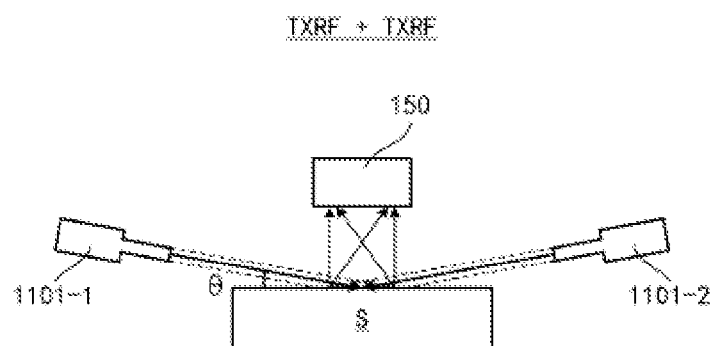

FIG. 8(f) schematically shows a combination of TXRF+TXRF. As shown in FIG. 8 (f), rays from different ray generating devices 1101-1 and 1101-2 may be incident onto the sample S at an incidence angle θ (slightly) smaller than the critical angle $\theta_c$ at different positions from the circumferential direction of the sample S, and the detector 150 may be configured to directly face sample S to receive the fluorescence. As described above, due to the large size of the light spot, the TXRF is generally only combined with the TXRF.

Similarly, although the ray source 110 is schematically shown as a single ray generating device in FIG. 8(a) to FIG. 8(c), and FIG. 8(e), more than one ray generating device may be switched on simultaneously.

Figure 9:
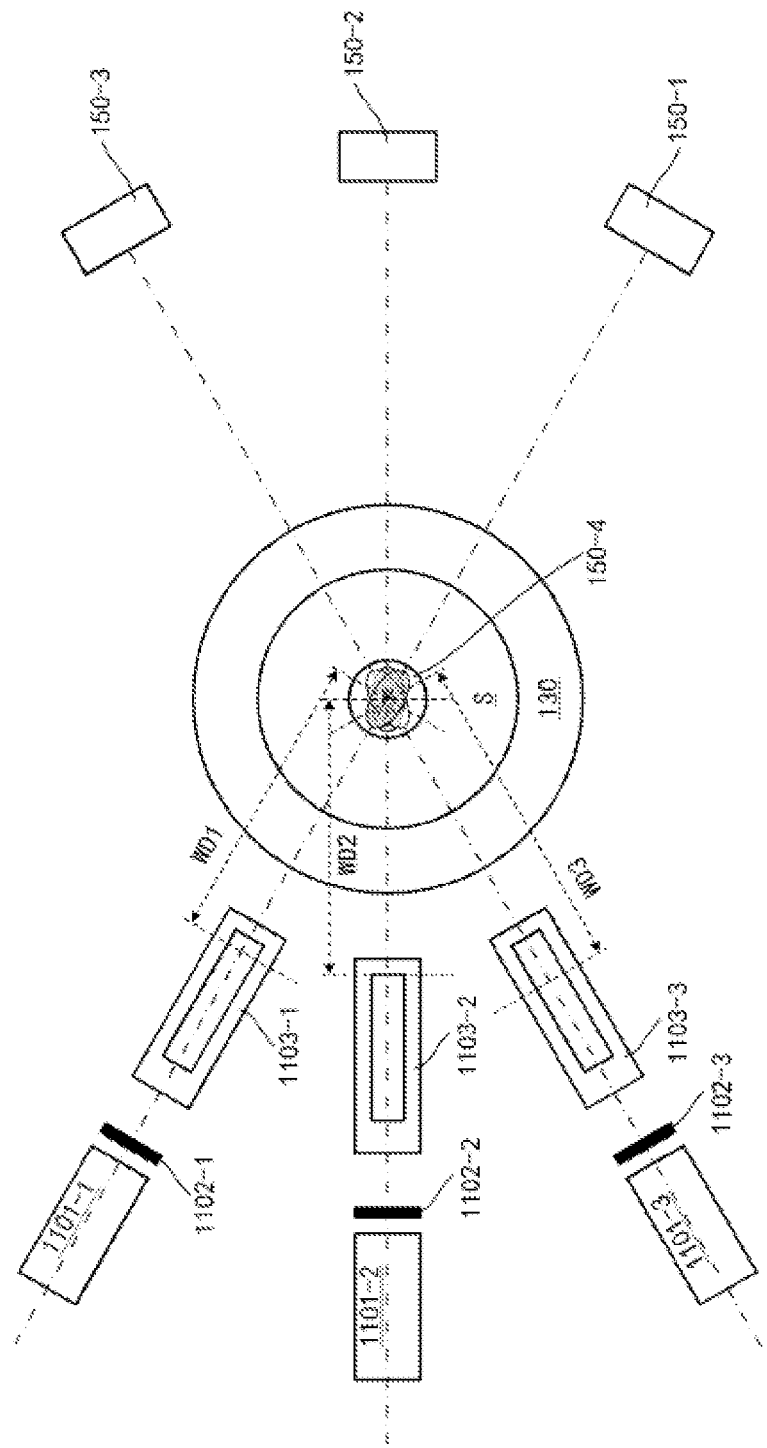
FIG. 9 schematically shows a top view of a 3×GIXRF+XRR configuration according to an embodiment of the present disclosure.

FIG. 9 schematically shows a top view of a 3×GIXRF+XRR configuration according to an embodiment of the present disclosure.

As shown in FIG. 9, each of the ray generating devices 1101-1, 1101-2 and 1101-3 may be provided as described above in combination with FIG. 4 to achieve the 3×GIXRF. In addition to providing a detector 105-4 directly facing the sample S to collect the fluorescence as described above, detectors 150-1, 150-2 and 150-3 may also be provided opposite to each of the ray generating devices 1101-1, 1101-2 and 1101-3 to collect reflected light due to the rays emitted by each of the ray generating devices 1101-1, 1101-2 and 1101-3 being reflected by the sample S to achieve the XRR analysis. In this example, XRR detectors 150-1, 150-2, and 150-3 are respectively provided for each of the ray generation devices 1101-1, 1101-2, and 1101-3. However, the present disclosure is not limited to this. For example, XRR detectors may be provided for only a part of the ray generation devices 1101-1, 1101-2, and 1101-3.

In the configuration of FIG. 9, an incidence angle of the ray from at least one ray generating device may be provided as the Bragg angle $\theta_B$, and the corresponding detector is provided at a corresponding angle (the exit angle=the incidence angle=$\theta_B$), which may realize the XRD configuration (as described above, the XRR detector and XRD detector may be the same type of detectors).

In the embodiment shown in FIG. 9, there are a plurality of XRR/XRD paths corresponding to the XRR/XRD detectors 150-1, 150-2 and 150-3. However, the present disclosure is not limited to this.

Figure 10:
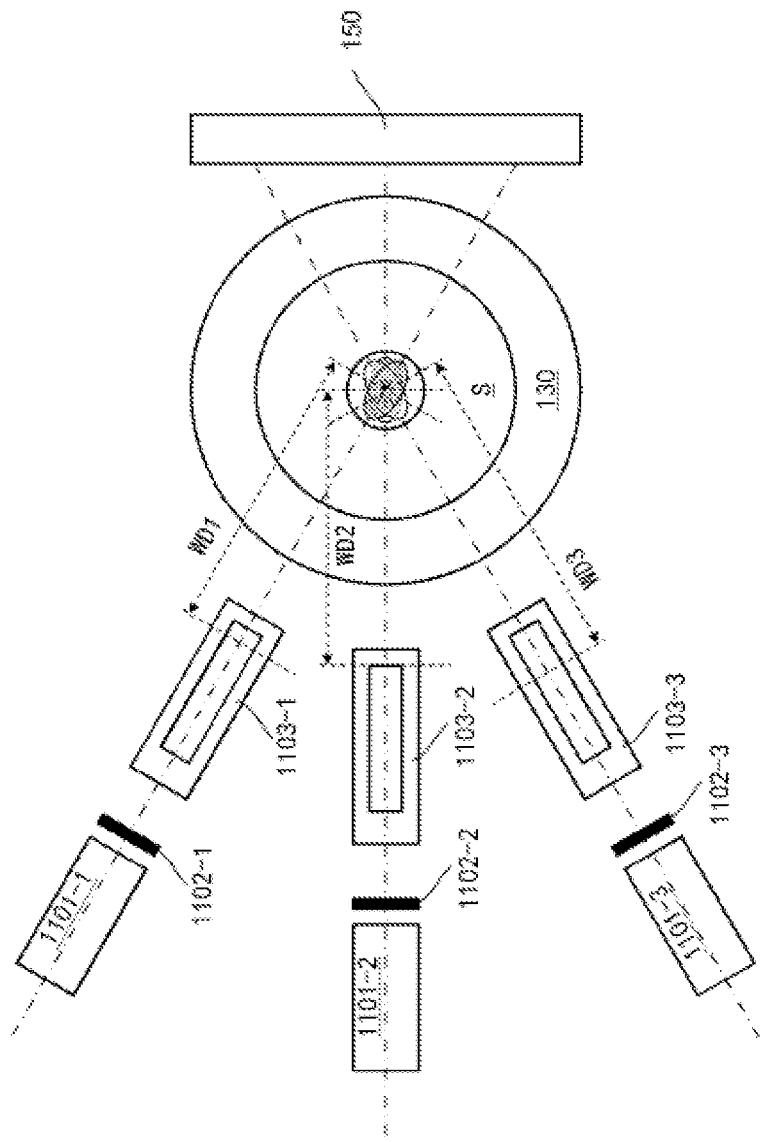
FIG. 10 schematically shows a single XRR path configuration according to an embodiment of the present disclosure.
Figure 11:
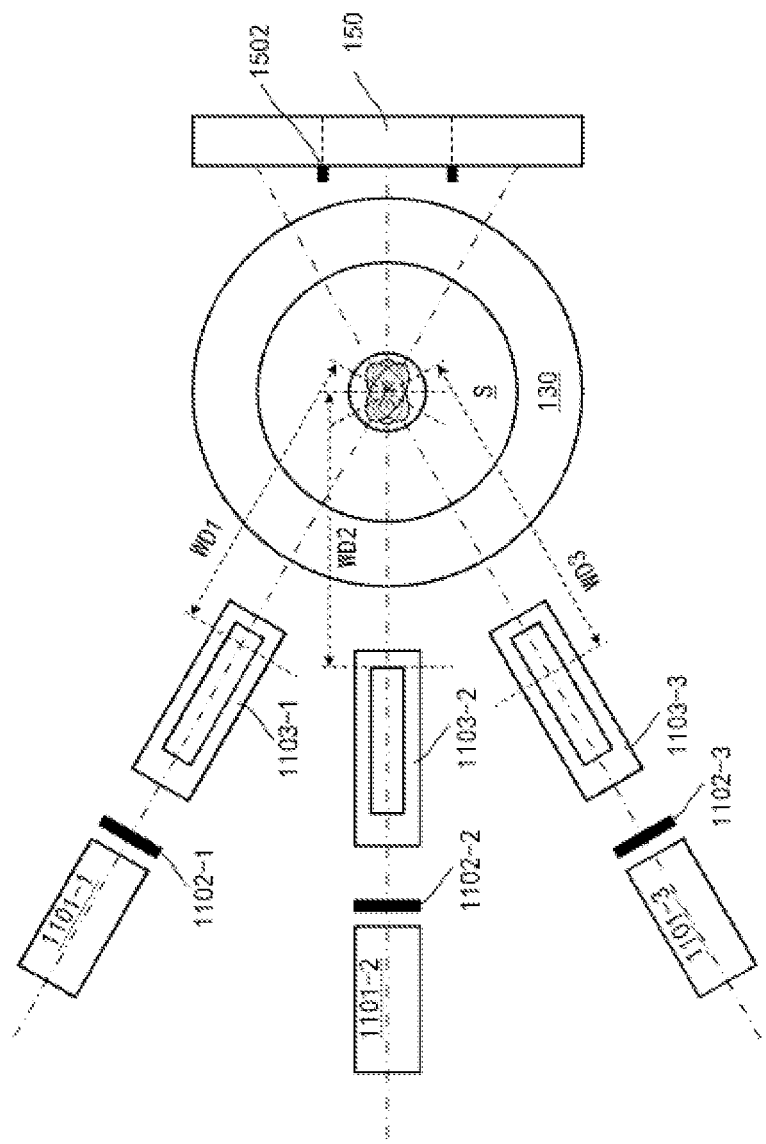
FIG. 11 schematically shows a single detector multi-XRR path configuration according to an embodiment of the present disclosure.

There may be only a single XRR/XRD path. For example, as shown in FIG. 10, the XRR/XRD detector 150 may have a certain range (for example, a linear array detector or an area array detector) to receive the rays from different ray generating devices. Alternatively, as shown in FIG. 11, a single XRR/XRD detector is included, but the XRR/XRD detector may provide a plurality of XRR/XRD paths. Specifically, the XRR/XRD detector 150 may include detection regions corresponding to the ray generation devices 1101-1, 1101-2 and 1103, and a blocking portion 1502 may be provided between adjacent detection regions to prevent mutual interference between the regions.

The embodiments of the present disclosure have been described above. However, these embodiments are for illustrative purposes only, and are not intended to limit the scope of the present disclosure. The scope of the present disclosure is defined by the appended claims and their equivalents. Without departing from the scope of the present disclosure, those skilled in the art may make various substitutions and modifications, and these substitutions and modifications should all fall within the scope of the present disclosure.

What is claimed is:
1. An X-ray analysis system, comprising:
    a ray source comprising a plurality of ray generating devices configured to generate a ray;
    a detector configured to detect a signal generated due to an analyzed object being irradiated by the ray from the ray source; and a controller configured to control the ray source, so that two or more ray generating devices in the ray source simultaneously generate corresponding rays to irradiate the analyzed object, wherein the detector comprises at least one of:
- a fluorescence detector configured to detect a fluorescence emitted by the analyzed object due to the analyzed object being irradiated by the ray from at least one of the two or more ray generating devices to perform an X-ray fluorescence (XRF) analysis;
- a reflected light detector configured to detect a reflected light obtained by the analyzed object reflecting the ray of at least one of the two or more ray generating devices to perform an X-ray reflection (XRR) analysis;
- a diffracted light detector configured to detect a diffracted light obtained by the analyzed object diffracting the ray of at least one of the two or more ray generating devices to perform an X-ray diffraction (XRD) analysis; and
- a scattered light detector configured to detect a scattered light obtained by the analyzed object scattering the ray of at least one of the two or more ray generating devices to perform a small angle X-ray scattering (SAX) analysis; and wherein the detector comprises the fluorescence detector and the rays of the two or more ray generating devices are configured to be incident onto the analyzed sample at an incidence angle less than a critical angle, and the fluorescence detector is configured to directly face the analyzed sample to perform a total reflection XRF (TXRF) analysis.

2. The X-ray analysis system according to claim 1, wherein the ray source and the detector comprises at least one of following configurations:
- the ray of the at least one of the two or more ray generating devices is configured to be incident onto an analyzed sample in a grazing incidence manner to perform a grazing incidence XRF (GIXRF) analysis;
- the fluorescence detector is configured to receive a grazing exit fluorescence to perform a grazing exit XRF (GEXRF) analysis; and
- the ray of the at least one of the two or more ray generating devices is configured to be incident onto the analyzed sample in a non-grazing incidence manner, and the fluorescence detector is configured to receive a non-grazing exit fluorescence to perform a normal XRF analysis.

3. The X-ray analysis system according to claim 2, wherein the X-ray analysis system is configured to simultaneously perform at least two of the GIXRF analysis, the GEXRF analysis, the normal XRF analysis, the XRR analysis, the XRD analysis and the SAX analysis.

4. The X-ray analysis system according to claim 1, wherein the analyzed sample is a wafer, the two or more ray generating devices are configured to emit parallel beams to form an elliptical light spot on the analyzed sample, a major axis of the light spot is substantially aligned with a diameter of the wafer, and a minor axis of the light spot corresponds to a diameter of the fluorescence detector.

5. The X-ray analysis system according to claim 4, wherein a plurality of fluorescence detectors are arranged in a straight line to cover the diameter or a radius of the wafer.

6. The X-ray analysis system according to claim 1, wherein the ray source is fixed, and the X-ray analysis system further comprises:
- a sample stage,
  wherein, when an analyzed sample is placed on the sample stage, the sample stage is configured to translate the analyzed sample so that the rays from the two or more ray generating devices scan the analyzed sample.

7. The X-ray analysis system according to claim 6, wherein:
- in the XRR analysis and the SAX analysis, the at least one of the two or more ray generating devices is configured such that the ray emitted by the at least one of the two or more ray generating devices is incident onto the analyzed sample in a grazing incidence manner; and
- in the XRD analysis, the at least one of the two or more ray generating devices is configured such that the emitted ray is incident onto the analyzed sample at a Bragg angle.

8. The X-ray analysis system according to claim 6, wherein the plurality of ray generating devices in the ray source are separately arranged along a circumferential direction of the sample stage, and are configured so that rays emitted by each ray generating device irradiate a same target region of the analyzed sample.

9. The X-ray analysis system according to claim 1, wherein:
- in the XRF analysis, the at least one of the two or more ray generating devices is configured to emit a monochromatic light or a polychromatic light; and
- in the XRR analysis, the XRD analysis or the SAX analysis, the at least one of the two or more ray generating devices is configured to emit the monochromatic light.

10. The X-ray analysis system according to claim 1, wherein, in the XRR analysis, the XRD analysis or the SAX analysis, the at least one of the two or more ray generating devices is configured to emit a convergent beam.

11. The X-ray analysis system according to claim 2, wherein:
- in the GIXRF analysis, the at least one of the two or more ray generating devices is configured to emit a convergent beam; and
- in the GEXRF analysis and the normal XRF, the at least one of the two or more ray generating devices is configured to emit a parallel beam or a converge beam.

12. The X-ray analysis system according to claim 1, wherein the controller is configured to select the two or more ray generating devices according to a characteristic of the analyzed sample so as to generate the rays simultaneously.

13. An X-ray analysis method, comprising:
- generating rays simultaneously from two or more ray generating devices, respectively;
- irradiating an analyzed object with the generated rays; and
- detecting a signal generated due to the analyzed object being irradiated by the rays, wherein the signal comprises at least one of:
- a fluorescence emitted due to the analyzed object being irradiated by the ray from at least one of the two or more ray generating devices to perform an X-ray fluorescence (XRF) analysis;
- a reflected light obtained by the analyzed object reflecting the ray of at least one of the two or more ray generating devices to perform an X-ray reflection (XRR) analysis;
- a diffracted light obtained by the analyzed object diffracting the ray of at least one of the two or more ray generating devices to perform an X-ray diffraction (XRD) analysis; and
- a scattered light obtained by the analyzed object scattering the ray of at least one of the two or more ray generating devices to perform a small angle X-ray scattering (SAX) analysis; and wherein the detecting of the fluorescence further comprises controlling the rays of the two or more ray generating devices to be incident onto the analyzed sample at an incidence angle less than a critical angle to perform a total reflection XRF (TXRF) analysis.

14. The X-ray analysis method according to claim 13, wherein, the method further comprises at least one of:

controlling the ray of the at least one of the two or more ray generating devices to be incident onto the analyzed sample in a grazing incidence manner to perform a grazing incidence XRF (GIXRF) analysis;

receiving a grazing exit fluorescence to perform a grazing exit XRF (GEXRF) analysis; and controlling the ray of the at least one of the two or more ray generating devices to be incident onto the analyzed sample in a non-grazing incidence manner, and receiving a non-grazing exit fluorescence to perform a normal XRF analysis.

15. The X-ray analysis method according to claim 14, further comprising:

performing at least two of the GIXRF analysis, the GEXRF analysis, the normal XRF analysis, the XRR analysis, the XRD analysis and the SAX analysis simultaneously.

16. The X-ray analysis method according to claim 13, further comprising selecting the two or more ray generating devices according to a characteristic of the analyzed sample to generate the rays simultaneously.

* * * * *